Figure 1:
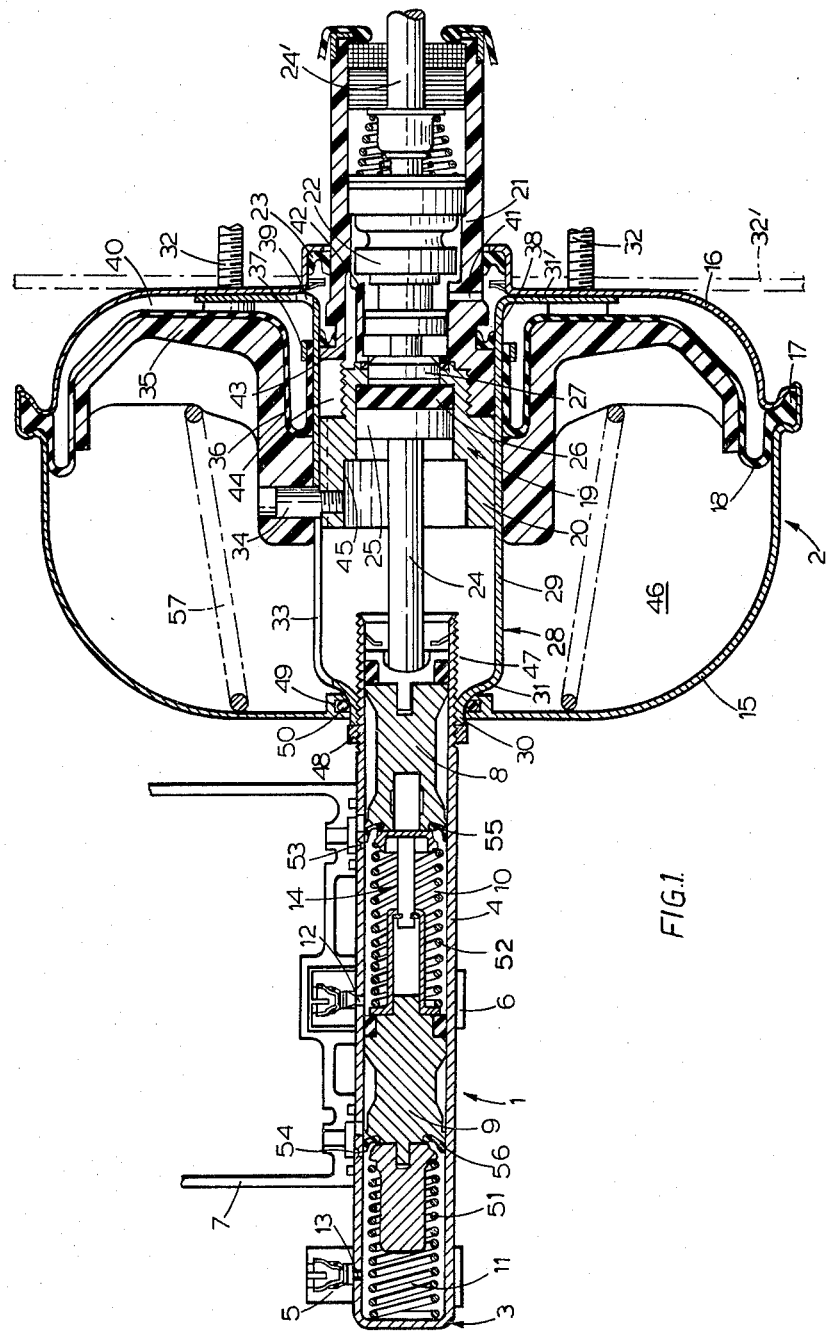

United States Patent [19]
Yardley

[11] 4,307,570
[45] Dec. 29, 1981

[54] BOOSTED MASTER CYLINDER ASSEMBLIES FOR VEHICLE BRAKING SYSTEM

[75] Inventor: Alfred Yardley, Kidderminster, England

[73] Assignee: Lucas Industries Limited, Birmingham, England

[21] Appl. No.: 102,746

[22] Filed: Dec. 12, 1979

[30] Foreign Application Priority Data

Dec. 12, 1978 [GB] United Kingdom ............... 48192/78

[51] Int. Cl.³ ........................ B60T 13/00; F15B 15/18
[52] U.S. Cl. .................................. 60/547 R; 60/588; 60/593; 92/13.41; 92/129; 92/107
[58] Field of Search ..................... 60/547 R, 593, 588, 60/589; 92/13.41, 129, 107, 165 PR, 166; 91/369 A

[56] References Cited

U.S. PATENT DOCUMENTS

| 3,027,879 | 4/1962 | Price | 60/547 R |
| 3,127,966 | 4/1964 | Sheriff | 60/547 R |
| 3,200,914 | 8/1965 | Downs | 60/547 R |
| 3,537,358 | 11/1970 | Bunyard | 92/166 |
| 4,201,057 | 5/1980 | Martin | 60/593 |
| 4,270,355 | 6/1981 | Green | 60/593 |

FOREIGN PATENT DOCUMENTS 1576178 7/1969 Fed. Rep. of Germany .... 60/547 R

*Primary Examiner*—Abraham Hershkovitz
*Attorney, Agent, or Firm*—Scrivener, Clarke, Scrivener and Johnson

[57] ABSTRACT

A servo booster is provided with a tube coaxial with the booster output rod for relieving the booster housing of braking reaction forces. The housing of a tandem master cylinder has an externally threaded rear end which is threadedly engaged with internal threads formed on a reduced diameter front part of the tube. The retracted position of the primary piston of the master cylinder is determined by abutment with the booster output rod, and this can be adjusted by turning the master cylinder housing relative to the tube.

5 Claims, 2 Drawing Figures

BOOSTED MASTER CYLINDER ASSEMBLIES FOR VEHICLE BRAKING SYSTEM

This invention relates to a boosted master cylinder assembly for a vehicle braking system and of the kind comprising an hydraulic master cylinder assembly and a servo booster assembly, the master cylinder assembly comprising a master cylinder housing provided with a bore in which is slidable a master cylinder piston, and the servo booster assembly comprising a servo booster housing, a movable wall, and an output member which is adapted to apply a force to the master cylinder piston, and the master cylinder assembly including a recuperation valve responsive to the axial position of the master cylinder piston in said bore. Such a boosted master cylinder assembly will hereinafter be referred to as "a boosted master cylinder assembly of the kind set forth".

It is important that in the retracted position of the master cylinder piston the recuperation valve should be open to provide fluid communication between an hydraulic reservoir and the pressure space of the master cylinder assembly. In the usual arrangement the master cylinder assembly incorporates a spring which biases the master cylinder piston rearwardly against a stop in the master cylinder, and the booster incorporates a further spring which biases the movable wall and the booster output rod rearwardly against the stop in the booster housing. It is necessary to ensure that the front end of the output rod in its retracted position does not hold the master cylinder piston off its stop, and also to ensure that there is not, on the other hand, a large axial spacing between the retracted piston and output rod. Since the retracted position of the front end of the output rod relative to the master cylinder housing is determined by the tolerances in a large number of dimensions in the master cylinder assembly and booster assembly it has usually been necessary to provide some means of adjusting the retracted position of the front end of the output rod, and the adjustment means, which often comprises a screw or shims, of each booster has required individual setting. This is a costly operation.

In published British Patent Application No. 2009871A various servo boosters are disclosed which incorporate a force transmitting means which extends through the movable wall of the booster from the front booster housing wall to the rear booster housing wall. The force transmitting means is stationary in use with respect to the vehicle and transmits braking reaction forces from the master cylinder housing to the vehicle bulkhead substantially to relieve the booster housing of the reaction forces and enable the use of a lightweight booster housing.

In the Description of our British Patent Application No. 35279/78 dated 1st Sept. 1979 (publication No. 2 031 806A) proposed a servo booster in which the force transmitting means comprises a tube which is co-axial with the booster output and input members.

According to the present invention in a boosted master cylinder assembly of the kind set forth the servo booster assembly comprises a force transmitting tube which is co-axial with the booster output member and extends through the movable wall, the master cylinder housing is threadedly connected to the tube, and the retracted position of the master cylinder piston is determined by its engagement with the booster output member.

Rotation of the master cylinder housing relative to the tube results in adjustment of the retracted position of the master cylinder piston relative to the master cylinder housing, and the threaded connection between the tube and the master cylinder housing therefore performs the dual functions of supporting the master cylinder and permitting adjustment of the retracted position of the master cylinder piston.

Preferably a thrust assembly is interposed between the input and output members of the booster assembly to transmit forward movement of the movable wall to the thrust assembly, the tube is provided with at least one aperture, and an arm extends through the aperture to connect the movable wall to the thrust assembly.

Preferably the rear end of the master cylinder housing is externally threaded, and the front end of the tube is formed with complementary internal threads. This enables a portion of the length of the master cylinder to be received within the tube and thereby keeps the overall length of the boosted master cylinder to a minimum.

The front end of the tube is preferably of reduced diameter as compared with the remainder of the tube, and conveniently the reduced diameter portion is backed by a step against which the front wall of the booster housing abuts. It is then unnecessary to provide a direct connection between the front booster housing wall and the master cylinder housing as is usually required.

According to a second aspect of the invention a method of adjusting the retracted position of the master cylinder piston of a boosted master cylinder assembly in accordance with the first aspect of the invention comprises passing fluid through the recuperation valve of the master cylinder, monitoring the fluid flow, turning the master cylinder housing relative to the tube to detect the position at which the valve opens or closes as indicated by a change in the fluid flow, and turning the master cylinder housing relative to the tube from said position by at least a predetermined amount to an adjusted position.

The adjustment is preferably effected before the booster housing is assembled to the tube. This is facilitated when the master cylinder housing simply comprises a deep-drawn tube, as disclosed in our British Patent Application No. 41581/78.

Figure 2:
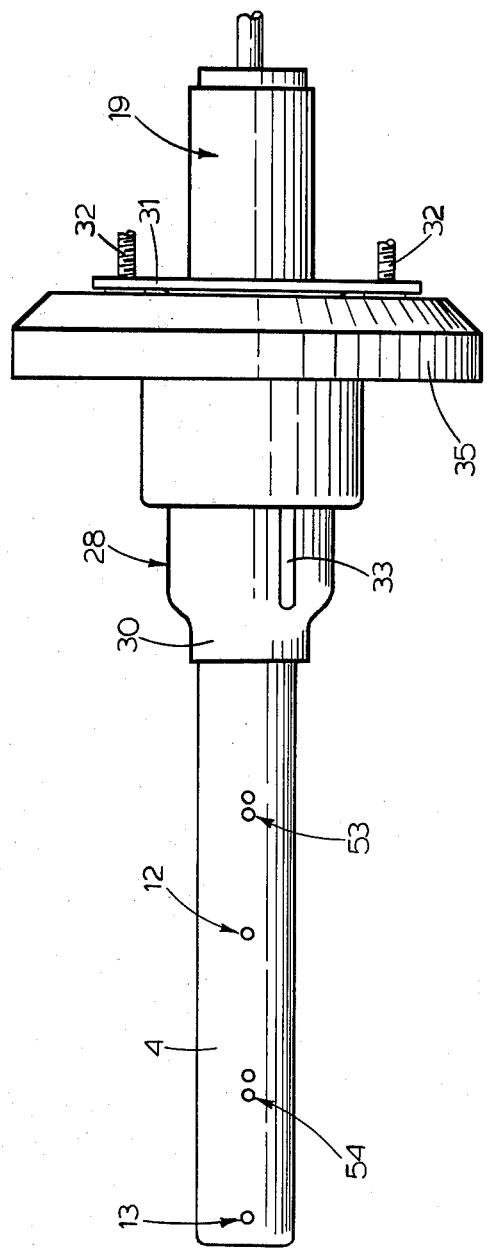

The invention will now be further described, by way of example only, with reference to the accompanying drawings in which:

FIG. 1 is a longitudinal cross-section of a boosted master cylinder assembly in accordance with the present invention with the parts being shown in their retracted positions; and FIG. 2 is a plan view of parts of the assembly of FIG. 1 at the stage of assembly at which adjustment of the retracted position of the primary master cylinder piston is effected.

With reference to FIG. 1 a boosted master cylinder assembly comprises a tandem master cylinder 1 connected to a vacuum servo booster 2. The master cylinder 1 has a master cylinder housing 2 of the kind described in our British Application No. 41581/78 and comprises a deep-drawn cylindrical tube 4 around which is clamped independently formed outlet port assemblies 5 and 6, and an hydraulic reservoir 7. Primary and secondary pistons 8 and 9 respectively are slidable in the bore of tube 4 to define primary and secondary pressure spaces 10 and 11 respectively which communicate permanently with outlet port assemblies 5 and 6 by way of drillings 12 and 13 respectively in tube 4. A resiliently biassed lost-motion connection 14 of well-known function is disposed between the pistons 8 and 9.

The servo booster 2 comprises sheet metal front and rear housing shells 15 and 16 respectively with the peripheral bead 16 of a flexible diaphragm 18 clamped between their radially outer peripheries. A valve body 19 comprises front and rear substantially cylindrical valve body parts 20 and 21 having a threaded engagement with each other. The rear part 21 houses a conventional pedal-operated poppet valve assembly 22 and is slidably sealed to the rear housing shell 16 by an annular seal 23. A booster output rod 24 carries a head 25 at its rear end which engages with an elastomeric reaction disc 26 arranged in well-known manner in front of a valve-control member 27. The head 25 and reaction disc 26 constitute a thrust assembly interposed between the output rod 24 and an input rod 24'.

A force transmitting means in the form of a sheet metal tube 28 coaxial with the input rod 24' and the output rod 24 comprises a main part 29, a front end part 30 of reduced diameter and connected to part 29 by a frusto-conical step 31, and a radial flange 31' at the rear end through which studs 32 pass for direct connection to a vehicle bulkhead 32'. The front half of the main part 29 is provided with three equi-angularly spaced axially extending slots 33 through which pass respective arms in the form of radial screws 34 connecting an annular diaphragm support plate 35 to the front valve body part 19. Flexible diaphragm 18 is sealed to the tube 28 by means of an integral rolling diaphragm portion 36 and a retaining ring 37. An annular seal 38 located in an external annular recess in rear valve body part 21 seals the valve body 19 to the tube 28 in front of a port 39 in the tube 28 which provides permanent fluid communication between rear booster chamber 40 and a radial port 41 in valve body part 21 located in front of a valve seat 42. A passage 43 in valve body part 21 together with a recess 44 and a further axial passage 45 in part 20 provide permanent fluid communication between front booster chamber 46 and the rear of valve seat 42.

The movable wall of the booster, constituted by diaphragm support plate 35 and flexible diaphragm 18, is urged to a retracted position in engagement with the heads of studs 32 by a coil spring 57 in front booster chamber 46.

The rear end of master cylinder tube 4 is formed with external screw threads 46 at its rear end in threaded engagement with complementary internal screw threads formed on the front end part 30 of the tube 28. Thus, in use any braking reaction forces are transmitted directly from the master cylinder tube 4 to the vehicle bulkhead 32' by the tube 28 without passing through the booster housing shells 15 and 16. An internally threaded locking ring 48 is threadedly engaged with the threads 47 to retain the tube 4 and tube 28 in an adjusted position. Front housing shell 15 is sealed to the front end 30 of the tube 28 by an annular seal 49 located to an internal annular trough 50.

A coil spring 51 located in secondary pressure space 11 biasses the secondary piston 9 rearwardly and, since coil spring 52 acting between the pistons is of higher fitted load than that of spring 51, the spring 51 acts to hold the primary piston 8 against the front end of the output rod 25 to define the retracted position of both the primary and secondary pistons 8 and 9 relative to respective recuperation ports 53 and 54. When the threaded connection between tubes 4 and 28 is correctly adjusted seals 55 and 56 on the respective pistons are located just rearwardly of the ports 53 and 54 respectively.

As shown in FIG. 2, the adjustment of the threaded engagement between tubes 4 and 28 is conveniently performed before either the booster and master cylinder have been fully assembled. With the internal components of the master cylinder located in tube 4, but without the parts 5, 6 and 7, the tube 4 is offered to the front end 30 of tube 28 and is threadedly engaged therewith. At this stage the flexible diaphragm 18 and the housing shells 15 and 16 have not been assembled to the booster. Air is then blown into the tube 4 through outlet ports 12 and 13, and the air flow through recuperation ports 53 and 54 is measured by suitable equipment. The tube 4 is clamped, and flange 31 is turned clockwise until the air flow through both ports 53 and 54 just ceases. The flange 31 is then turned anticlockwise by a predetermined amount and then by sufficient amount to orient the studs 32 in a vertical plane, and locking ring 48 is secured in place. The retracted positions of both pistons 8 and 9 are now correctly adjusted. The front housing shell 15 is then slid into position over tube 4 before the parts 5, 6 and 7 are clamped to tube 4. The diaphragm 18 and rear shell 16 can then be secured in place.

In a modification, not illustrated, the front end of the force transmitting tube 28 is adapted to be connected to the vehicle bulkhead, so that the bulkhead 32' is positioned between the master cylinder and the booster, and the rear end 31' of the tube 28 is used to support a pivot for a foot pedal which acts upon the input rod 24'.

I claim:

1. A boosted master cylinder assembly for a vehicle braking system comprising an hydraulic master cylinder assembly and a servo booster assembly; said master cylinder assembly comprising a master cylinder housing provided with a bore, a master cylinder piston slidable in said bore, and a recuperation valve responsive to the axial position of said piston in said bore; said servo booster assembly comprising a servo booster housing, a movable wall located in said booster housing, an output member engaging with said master cylinder piston, a force transmitting tube which is co-axial with said output member and extends through said movable wall; said boosted master cylinder assembly further comprising a threaded connection between said master cylinder housing and said tube, and the retracted position of said master cylinder piston being determined by engagements of said piston with said output member, whereby said retracted position is adjustable by relative rotation of said master cylinder housing and said tube.

2. A boosted master cylinder assembly as claimed in claim 1 wherein said servo booster assembly further comprises an input member, and a thrust assembly interposed between said input and output members, said tube is provided with an aperture and an arm extends through said aperture to connect said movable wall to said thrust assembly.

3. A boosted master cylinder as claimed in claim 1 wherein said threaded connection comprises external threads on said master cylinder housing, and internal threads on said tube threadedly engaged with said external threads.

4. A boosted master cylinder as claimed in claim 1 comprising a front wall of said booster housing adjacent to said master cylinder assembly, a reduced diameter front end of said tube, a step in said tube connecting said front end of said tube to the remainder of the tube, said front wall being provided with a central hole and being located on said front end and in engagement with said step.

5. A method of adjustment applied to a boosted master cylinder assembly for a vehicle braking system comprising an hydraulic master cylinder assembly and a servo booster assembly; said master cylinder assembly comprising a master cylinder housing provided with a bore, a master cylinder piston slidable in said bore, and a recuperation valve responsive to the axial position of said piston in said bore; said servo booster assembly comprising a servo booster housing, a movable wall located in said booster housing, an output member engaged with said master cylinder piston, a force transmitting tube which is co-axial with said output member and extends through said movable wall; said boosted master cylinder assembly further comprising a threaded connection between said master cylinder housing and said tube, and the retracted position of said master cylinder piston being determined by engagements of said piston with said output member, whereby said retracted position is adjustable by relative rotation of said master cylinder housing and said tube; the method comprising the steps of passing fluid through the recuperation valve of the master cylinder, monitoring the fluid flow, turning the master cylinder housing relative to the tube to detect the position at which the valves opens or closes as indicated by a change in the fluid flow, and turning the master cylinder housing relative to the tube from said position by at least a predetermined amount.

* * * * *